United States Patent
Malcosky et al.

[11] 3,875,759
[45] Apr. 8, 1975

[54] HEAT EXCHANGE EVAPORATOR

[75] Inventors: Norman D. Malcosky, Columbus; Kanwal N. Singh, Westerville, both of Ohio

[73] Assignee: Columbia Gas System Corporation, Wilmington, Del.

[22] Filed: Apr. 13, 1973

[21] Appl. No.: 350,823

[52] U.S. Cl. .................. 62/394; 62/476; 165/161
[51] Int. Cl. ............................................. B67d 5/62
[58] Field of Search ...... 62/393, 389, 394; 165/159, 165/161

[56] References Cited
UNITED STATES PATENTS
2,146,141  2/1939  Harris .................................. 165/161
2,653,014  9/1953  Sniader ................................ 62/394

Primary Examiner—Meyer Perlin
Attorney, Agent, or Firm—Curtis, Morris & Safford

[57] ABSTRACT

A refrigerant evaporator-chiller and heat exchanger for use in an absorption type refrigeration system and which includes a generally cylindrical outer casing or shell and a hollow cylindrical tank or core centrally positioned therein and spaced therefrom so as to define an annular fluid flow chamber. A helical metal strip vane is positioned within this annular chamber and forms a closed helical passageway between the opposing walls of the tank and the shell. A helical evaporator tube is positioned on said helical strip concentrically within and extending through the helical passageway. The construction provides heat transfer between refrigerant which flows through the tube and is evaporated therein and a liquid flowing through the helical passageway.

10 Claims, 1 Drawing Figure

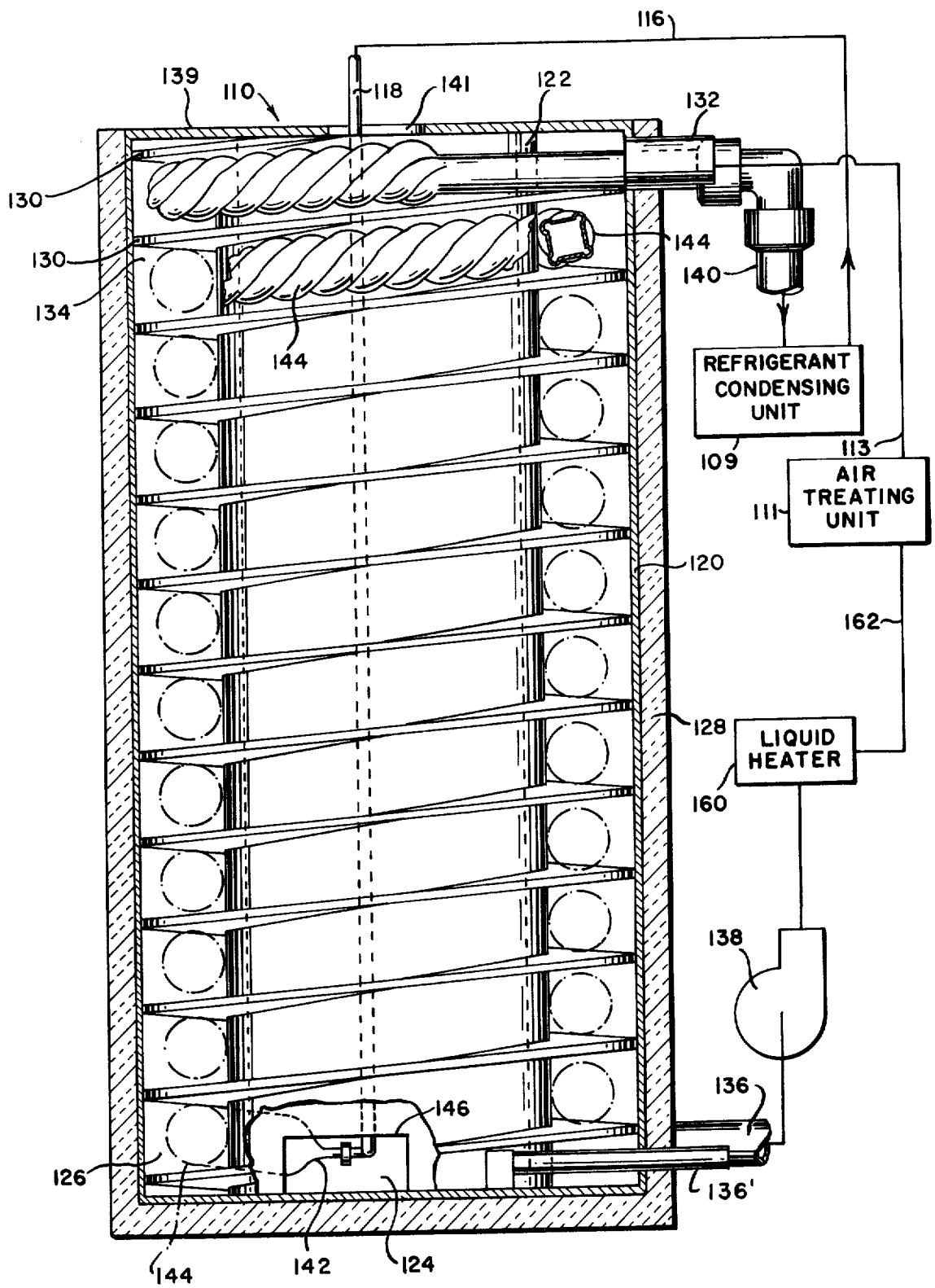

HEAT EXCHANGE EVAPORATOR

The present invention relates to heat exchangers and, in particular to a refrigerant evaporator-liquid chiller which is adapted to be used as the evaporator of an absorption type air conditioning system.

There has recently been an increased demand for improved air conditioning heating and cooling units for use in residential space conditioning. In particular, the demand has increased for gas fired air conditioning units which are compact in size and quiet in operation while maintaining high standards of performance and reliability with minimum service over extended periods of time.

In order to limit the amount of space occupied in a home or residential building by air conditioning and heating systems, it has become desirable to produce residential gas air conditioning systems which can also serve as heating systems during the winter months and thus provide complete space air conditioning for residences in a single unit or package. It is also desirable for an air conditioning system for a home to be located out of doors, thereby providing maximum occupiable space within the residence itself.

All of these features are achieved with the compact air conditioning system which is disclosed in U.S. Pat. application Ser. No. 350,822, filed Apr. 13, 1973, now Pat. No. 3,828,575, the disclosure of which is incorporated herein by reference, and which is assigned to the assignee of the present application. One important component of that system is the evaporator-heat exchanger or evaporator-chiller unit which is used to cool a liquid heat exchange medium that is supplied to the conventional fan/coil heat exchanger unit or units for cooling air for the conditioned space. It is necessary to use compact and efficient constructions for the various components therein, including the evaporator-chiller which is normally one of the larger components of the system.

Accordingly, it is an object of the present invention to provide economical, inexpensive and reliable refrigerant evaporator chillers. Another object is to provide an economical and efficient evaporator for use in an absorption type air conditioning system, and which contributes to providing a system which is compact and simple in construction, and efficient and dependable in operation. A further object is to provide evaporator-chiller and other heat exchange constructions which will provide maximum heat transfer between fluids flowing therein in the manner of the present disclosure.

In accordance with an aspect of the present invention, a heat exchanger structure in the form of an evaporator is provided as a component of an absorption type air conditioning system such as that disclosed in the above-mentioned copending U.S. Pat. application. As disclosed therein the air conditioning cycle of that system produces liquid refrigerant which is supplied to the evaporator-chiller through a restrictor. As a result, the refrigerant evaporates while flowing through the evaporator and cools a heat exchange liquid flowing countercurrently thereto. This cooled heat exchange liquid is then supplied to a conventional fan/coil heat exchange unit or units in the home wherein air is fan driven over a heat exchange coil (or coils) through which the cooled heat exchange liquid flows, and the cooled and dehumidified air is distributed throughout the conditioned space.

In the illustrative embodiment of the present invention, the evaporative-chiller has a generally cylindrical vertical axis outer shell surrounding a central hollow cylindrical tank or core, so as to form an annular fluid flow chamber between the shell and the core. A helically wound vane or strip in the annular fluid flow chamber is secured to the tank and defines a helical flow path in the form of a spiral or helical passageway around the outer vertical wall of the tank. The heat exchange liquid flows along that flow path and thence through the bottom of the tank side wall into the tank. The tank serves as a combination reservoir and expansion tank for the heat exchange liquid. A helically wound evaporator tube is positioned concentrically about the tank through the helical passageway, and liquid refrigerant is supplied to the lower end of the evaporator and flows countercurrently to liquid flowing downwardly in the helical passageway. This construction is relatively small and still provides efficient heat transfer between the fluids. The following detailed description of an illustrative embodiment of the present invention is to be read in connection with the accompanying drawings wherein the single FIGURE is a vertical sectional view of the evaporator-chiller, with parts broken away, and with the remainder of the system indicated schematically.

Referring to the drawings, a heat exchange structure in the form of an evaporator-chiller 110 is the evaporator-heat exchanger in an absorption type refrigeration system which is disclosed in the above-identified U.S. Pat. application. Evaporator-chiller 110 cools a heat exchange liquid which is supplied to the air cooling coil of an air-treating unit 111 through which air is blown so as to be "conditioned," i.e., heated or cooled and dehumidified. This conditioned air is supplied through a plenum chamber and duct work system to the various rooms of the house or other building. The unit 109 of which evaporator chiller 110 is a part of an absorption refrigeration system and is part of an air conditioning unit which includes a gas-fired liquid heater. The details of the refrigeration system are disclosed in the above-identified patent application. Normally, the air conditioning unit is located outside of the building, and the heat exchange liquid used in the system is an ethylene glycol solution which will not freeze during the winter months.

The single FIGURE is a vertical section of the evaporator-chiller of the illustrative embodiment of the invention, together with a schematic representation of the system associated therewith.

Evaporator-chiller 110 includes a vertical axis outer cylindrical vessel 120, which has an outer heat insulation layer 128, and an inner cylindrical sump tank or core 122. Tank 122 has a rectangular aperture 124 at its bottom edge which connects the hollow interior of the tank with the bottom of an annular space 126 formed between the tank and vessel 120. A spiral metal fin or vane 130 in space 126 is secured to the periphery of tank 122 and has a width equal to the width of the annular space 126, so that the vane defines a closed spiral fluid-flow conduit or passageway 134 surrounding tank 122. The heat exchange liquid flows from the air-treating unit 111 through a line 113 and inlet port 132 to the uppermost end of spiral passageway 134. The heat exchange liquid flows downwardly along the spiral passageway to aperture 124 through which it is discharged into tank 122. The liquid is pumped from the tank by a pump 138 through a conduit 136, and from the pump through a liquid heater 160 and a line 162 to unit 111. Hence, the pump causes the heat exchange liquid to flow from and to tank 122 with forced flow and does not rely solely on gravity flow of the heat exchange medium through passageway 134.

The top wall 139 of evaporator-chiller 110 has a central opening 141 through which a liquid refrigerant capillary tube 118 extends downwardly along the axis of the tank 122. The capillary tube supplies liquid refrigerant from the refrigerant condensing unit 109 of the refrigeration system to the evaporator-chiller for cooling the heat exchange liquid. Capillary tube 118 extends from tank 122 through aperture 124 into the lower end of spiral passageway 134 where it is connected to the inlet end portion 142 of a tubular evaporator 144. Evaporator 144 is a one-inch diameter aluminum tube which, as shown in the upper right-hand portion of the drawing, is square in cross-section with flutes 145 at the four corners of the square, and the tube is twisted about its longitudinal axis to form a spiral flute configuration throughout its entire length. The fluted tube is then wound into a helix or open spiral of the same radius and pitch as passageway 134, and the evaporator thus formed is assembled with the other components so that it extends the entire length of the passageway, with the evaporator being supported on vane 130.

The refrigerant passing from capillary tube 118 flows spirally upwardly through the evaporator countercurrently to the downward flow of the heat exchange liquid. The refrigerant is evaporated and passes through a discharge line 140 to refrigeration condensing unit 109. The heat-exchange liquid is thereby cooled by direct contact with the walls of the evaporator and indirectly by the surfaces of vane 130 and tank 120 which are cooled because the evaporator is supported by the vane which is attached to the tank. The spiral flute configuration of the evaporator wall provides the desired turbulence of the heat exchange liquid as it flows downwardly through passageway 134. Hence, tank 122 receives the heat exchange liquid at a satisfactory chilled temperature and acts as a reservoir or sump tank. Tank 122 also acts as an expansion chamber for the heat exchange liquid for the entire body of the heat exchange liquid and permits variations in the volume of the liquid as occur due to changes in the operating conditions.

An additional conduit 136' is connected to evaporator 110 and extends therethrough into interior tank 122. The right end of this tube is connected, outside of the evaporator, to a plastic tube or the like (not shown) by which the liquid level in the tank 122 can be checked. That is, by holding the plastic tube vertically, the tank 122, conduit 137 and the plastic tube act as a manometer. Of course, the plastic tube may be provided with a pinch valve or the like to prevent discharge of fluid from tank 122.

It is thus seen that a very efficient and dependable heat exchange construction is provided which is particularly adapted for use as the evaporator-chiller component of an absorption refrigeration system in an air conditioning system.

As pointed out above and as fully explained in the above-identified patent application, the single liquid flow circuit for the heat exchange fluid is used for both heating and cooling the conditioned space. The liquid heater is operated only when the refrigeration system is inoperative and during that time the heat exchange liquid flows through the evaporator chiller with no change in temperature. While passageway 134 provides very satisfactory heat exchange with the refrigerant when the heat exchange liquid is being cooled, the passageway does not interfere with the desired flow of the heat exchange liquid during the time that the system is used to heat the conditioned space. Similarly, the liquid heater does not interfere materially with the operation of the system when the air conditioned space is being cooled. Although an illustrative embodiment of the present invention has been described herein with reference to the accompanying drawing, it is to be understood that the invention is not limited to that precise embodiment and that various changes and modifications may be effected therein by one skilled in the art without departing from the scope or spirit of this invention.

What is claimed is:

1. An evaporator-chiller construction comprising, the combination of, a generally cylindrical shell, a hollow cylindrical tank concentrically positioned within said shell and defining therewith an annular fluid-flow chamber, helical means within said annular chamber forming a closed helical fluid-flow passageway between the opposing walls of said core and said shell, a helical evaporator of substantially the same mean radius and pitch as said passageway and positioned therein concentric with said tank, said evaporator comprising a fluted tube having a generally square cross-sectional configuration and being helically wound along its longitudinal axis to thereby provide helical flutes to provide turbulant flow of fluid therealong, and means to direct a stream of liquid to be cooled through said helical passageway, said evaporator providing an evaporator flow path for passing refrigerant in intimate heat exchange relationship with a liquid flowing through said helical passageway.

2. Apparatus as defined in claim 1 wherein said helical passageway has a vertical axis and said liquid to be cooled flows through said helical passageway countercurrent to the flow of refrigerant through said evaporator.

3. Apparatus as defined in claim 2 wherein the lower end of said helical passageway is open at its lower end to said tank, whereby said tank provides a reservoir chamber for liquid flowing from said helical passageway.

4. Apparatus as defined in claim 3 including pump means for circulating said second liquid from said tank along a heat exchange path and back to said tank through said helical passageway.

5. Apparatus as described in claim 2 wherein said helical means comprises a metal vane attached in heat exchange relationship to the outer surface of said tank and providing support for said evaporator.

6. Apparatus as described in claim 2 which includes a capillary tube restrictor extending vertically downwardly through said tank with its lower end connected to said evaporator to supply liquid refrigerant thereto.

7. Apparatus as described in claim 2 wherein said shell has a cylindrical side wall and a closed bottom wall and wherein said tank comprises a cylindrical wall positioned upon said bottom wall, and insulation means covering said side wall and said bottom wall.

8. Apparatus as described in claim 1 wherein said refrigerant and liquid flow countercurrently respectively in said fluted tube and said helical passageway.

9. An evaporator-chiller and storage tank comprising a vertical outer wall, an inner wall coextensive therewith and spaced inwardly toward the vertical axis of said tank and providing a narrow annular space therebetween, a metal strip bridging said annular space between the outer surface of said inner wall and the inner surface of said outer wall and slanted axially downwardly in the longitudinal dimension of the strip thereby to provide a continuous downwardly-sloping liquid passageway between said walls and adjacent turns of said strip, an evaporator tube assembly comprising a tube positioned within and extending along said passageway and providing a continuous refrigerant flow path, said tube assembly having a fluted exterior surface substantially throughout its entire length for producing turbulence in the flow of the liquid in said passageway and thereby improve the heat exchange relationship between refrigerant respectively passing through said tube and liquid flowing along said passageway exterior of said tube; insulating means surrounding said tank, means for supplying liquid refrigerant to one end of said tube and for withdrawing refrigerant gas from the other end of said tube, and means for directing a stream of liquid to be cooled through said passageway.

10. Apparatus as described in claim 9 wherein the said liquid which is cooled is stored in said tank.

* * * * *